Dec. 17, 1963 J. G. FIDELMAN 3,114,635

METHOD OF PHOTOGRAPHY INCLUDING PHYSICAL CONTACT OF TWO LAYERS CAPABLE OF REACTING WITH EACH OTHER IN THE PRESENCE OF LIGHT

Filed March 30, 1961

INVENTOR
J. George Fidelman

BY Lawrence I Field

ATTORNEY

United States Patent Office 3,114,635

Patented Dec. 17, 1963

3,114,635

METHOD OF PHOTOGRAPHY INCLUDING PHYSICAL CONTACT OF TWO LAYERS CAPABLE OF REACTING WITH EACH OTHER IN THE PRESENCE OF LIGHT

J. George Fidelman, Fort Lauderdale, Fla., assignor to Horizons Incorporated, Cleveland, Ohio, a corporation of New Jersey Filed Mar. 30, 1961, Ser. No. 99,412
8 Claims. (Cl. 96—27)

This invention relates to a photographic method and apparatus. More particularly, it relates to an improvement in photosystems described in earlier filed patent applications (noted below) in which the photosensitive systems comprise (1) a first component which consists of one or more organic halogen compounds wherein one carbon atom is attached to a plurality of halogen atoms, which compounds experience a photolytically induced decomposition when exposed to radiation of suitable intensity and suitable wavelength; and (2) a second component which consists of one or more compounds which experience a color-forming chemical change concurrently with and presumably as a result of the photolytically induced decomposition of the organic halogen-containing compound.

In general, practice of the inventions described in the foregoing photographic systems involves the following operations:

(*a*) Preparation of a photosensitive composition as a thin film or layer;

(*b*) Exposure of the composition to a suitable dose of radiant energy to produce either a visible image which develops directly on exposure, or a latent image which is developed into a visible image by purely dry means such as heating; and (*c*) Fixing of the visible image, to produce a permanent record of the same, while at the same time destroying any latent, unused photosensitivity in the undeveloped portions of the composition.

In order to achieve permanent fixing of the visible image and to insure that inadvertent reexposure does not produce a second image, it is necessary to either inactivate one or more of any remaining active constituents of the photosensitive composition or to remove them from the composition after exposure. If either of these approaches leaves a sufficiently large residue of the active constituents in the exposed composition, there always remains a real possibility of fogging or double exposure.

The present invention is directed to a modification of the above photoprocesses which avoids entirely the difficulties experienced in prior fixing procedures. Briefly, in accordance with this invention, the procedures described in the below noted patent applications are modified as follows:

(*a*) At least the major portion of the organic halogen-containing compound is omitted from the photosensitive composition when the same is originally formulated by mixing the constituents;

(*b*) Exposure and image development are accomplished by bringing the omitted photolytically active organic halogen-containing compound into physical contact with that portion of the prepared photosensitive composition which is undergoing exposure, whereby sensitization, exposure and image development occur virtually simultaneously; and (*c*) Fixing the image, e.g. by a brief exposure to infrared or by other suitable "dry" techniques.

It will be seen that the introduction of the photolytically active organic halogen-containing compound into the system in the manner described above has numerous advantages as compared with systems in which it is present in the original photosensitive composition. First of all, the possibility of accidental exposure and consequent spoilage of the film is greatly diminished; secondly, the shelf-life of the photosensitive composition, minus the photolytically active organic halogen-containing compound is extended almost indefinitely; thirdly, the photographic speed of freshly sensitized compositions often exceeds that of "stale" compositions; and finally, the problem of removing residual amounts of photolytically-active organic halogen-containing compounds from the exposed film is entirely eliminated.

The manner in which my invention may be practiced may be varied considerably. In the description which follows, a number of modes are described but these are to be considered illustrative, as they will readily suggest alternative modes to others skilled in the art.

Figure 1:
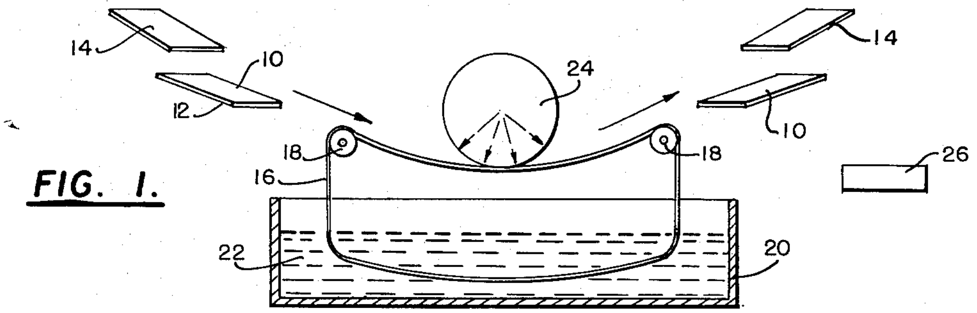
FIGURE 1 is a diagrammatic view in section of one device and manner of mechanically carrying out the process.

In the system shown in FIGURE 1 images are produced on individual sheets 10 bearing a photosensitive composition either as a surface coating 12 or as an impregnant in sheet 10. The desired images are produced by superposing a master 14 on the photosensitive sheet 10 and feeding the resulting sandwich onto a moving belt 16. Belt 16 is an endless belt of absorbent material supported by driven rollers 18. The lower run of the belt passes through a tank 20 containing a supply of suitable organic halogen compound 22, preferably in liquid form. The upper reach of the belt 16 receives the sheets 10, on which the master 14 is supported and conveys them past a source of light, shown as cylinder 24, which is positioned so as to bear against the belt 16. As a result, the lower side of sheet 10 which is the impregnated or coated side, is caused to intimately contact the belt 16, soaked with liquid 22. In this way, transfer of some of liquid 22 into layer 12 on sheet 10 is effected as the sheet 10 is fed past the light 24. As a result, sensitization and exposure are concurrently effected. After exposure the sheet 10 leaves the belt and is separated from the master 14 by any suitable means. Fixing is accomplished by a source of infrared 26 placed in the path of the exposed sheet 10, after the master has been separated from sheet 10.

Figure 2:
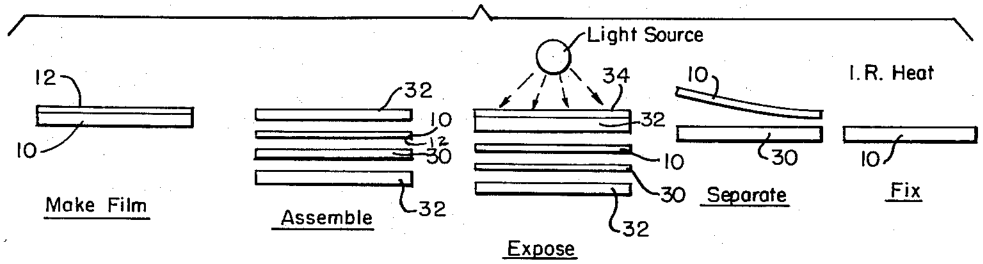
FIGURE 2 is a diagram of a second method, showing in sequence steps which may be carried out by hand.

FIGURE 2 shows a hand operation sequence in which the same steps are accomplished by placing a blank 30 of absorbent material impregnated with organic halogen-containing compound in physical contact with the sensitive surface of sheet 10. The method is more fully described in the examples below.

Figure 3:
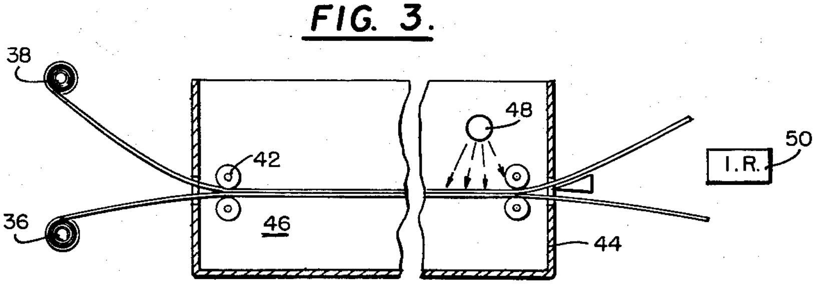
FIGURE 3 represents still another modification.

FIGURE 3 shows a modification in which the master 36 and photosensitive sheet 38 are continuously or intermittently fed between rollers 42 located in a chamber 44 wherein the organic halogen-containing compound is confined as a vapor 46. Twoard the exit end of chamber 44 a light source 48 effects exposure of the vapor treated sheet. Fixing is as in FIGURE 1, by means of infrared lamp 50.

In the inventions described in earlier copending applications, Serial No. 787,112, filed January 16, 1959, by Eugene Wainer and issued July 3, 1962, as United States Patent 3,042,515, and in improvements thereon disclosed and claimed in United States patent application Serial No. 841,859 and 841,860, both filed September 22, 1959; Serial No. 842,569, filed September 28, 1959; Serial Nos. 1,161 and 1,162, filed January 8, 1960; Serial No. 22,703, filed April 18, 1960, and Serial No. 23,130 filed April 19, 1960 (all filed by Eugene Wainer), the photosensitive systems are based on the interaction of (1) an organic halogen-containing compound such as carbon tetrabromide, which appears to generate halogen free radicals on exposure to suitable radiation and (2) originally colorless arylamines which convert to a colored reaction product when acted upon by the halogen free radical. The photosensitive systems may contain a resinous or plastic base material and various additional ingredients whose presence increases the sensitivity to light of various wavelengths or improves the keeping qualities, or expedites fixing or imparts various other benefits. My invention is applicable to each of the photosystems disclosed in the aforesaid applications, whose disclosures are hereby incorporated into the present application.

In addition, in a group of applications filed by Robert H. Sprague and others, namely application Serial Nos. 42,233, filed July 12, 1960; 47,849, filed August 5, 1960; and 50,696, filed August 19, 1960, photosensitive systems are described involving combinations of (1) photolytically active organic halogen-containing compounds of the type described in the aforesaid Wainer applications and (2) various dyes which bleach-out on exposure to suitable radiation. The present invention is equally applicable to the photographic systems therein disclosed and these disclosures are incorporated herein, by reference.

Generally the organic halogen compounds most useful for the present invention are those represented by the formula R—C—$X_3$, wherein R is intended to represent a member selected from the group consisting of H, Cl, Br, I, alkyl, substituted alkyl, aryl and substituted aryl and each X is a halogen selected from the group consisting of Cl, Br and I.

The amines in the above-identified Wainer applications are aryl amines, preferably secondary amines represented by the formula $$\begin{array}{c} \mathrm{H} \\ | \\ \mathrm{R—N—R_1} \end{array}$$

wherein at least one of R and $R_1$ is an aromatic nucleus and the other is aromatic or alkyl. A particularly preferred class of amines are the N-vinylamines which yield latent images.

The polymethine dyes described in the above-identified Sprague et al. applications are cyanines, styryl, merocyanines and the like.

The following specific examples of preferred embodiments of my invention are to be construed as illustrative.

*Example 1*

A sheet of paper 10 is painted with a solution consisting of 1 gram diphenylamine dissolved in 10 cc. of acetone. The painted sheet is allowed to dry in air.

A second sheet of paper 30 is coated with a 25% solution of carbon tetrabromide in acetone.

The two sheets are brought into close contact by placing the first sheet on the second sheet between two sheets 32 of glass. Then a suitable subject on translucent paper or film 34 is placed on top of the upper sheet of glass, in the usual manner for making contact prints, and the whole "sandwich" is exposed to a suitable light (a General Electric sunlamp gives satisfactory results) for 10 to 20 seconds. A print of the subject is obtained on the diphenylamine-coated sheet which is a negative copy of the original subject.

Instead of the carbon tetrabromide sheet being placed beneath the diphenylamine-coated sheet, a clear film (cellulose acetate) similarly coated with $CBr_4$ may be placed between the subject and the diphenylamine-coated sheet, the coated side of the film in contact with the coated face of the diphenylamine-coated sheet. In this case, somewhat shorter exposures are required.

The print is fixed by a short heating under an infrared lamp to drive off any residual sensitizer.

*Example 2*

If instead of a negative copy, a positive copy is desired, this can be accomplished by substituting for the diphenylamine a small amount of a dye capable of bleaching when irradiated in the presence of $CBr_4$—selected for instance from the group of polymethine dyes such as the cyanines, merocyanines, styryls, or related dyes.

A sheet of paper was coated with 10 mg. of the styryl dye, 4 - [4-p-dimethylaminophenyl]-1,3-butadienylquinoline metho-p-toluenesulfonate, in 7 cc. of a mixture of equal parts by volume of methanol, acetone, and dimethylformamide. This coated sheet, after drying, was exposed in contact with a sheet of film containing $CBr_4$ in the same manner as described in Example 1 above, and yielded a direct positive copy of the original subject after several seconds' exposure to a photoflood lamp. Again, a simple short heating sufficed to remove the residual sensitizer and render the print inert to further action of light.

Having now described my invention in accordance with the patent statutes, I claim:

1. In a process of producing images in a photosystem in which an image is formed by interaction of the photolytically generated halogen containing free radicals resulting from the decomposition of an organic halogen-containing compound represented by the formula R—C—$X_3$ wherein R is selected from the group consisting of H, Cl, Br, I alkyl and aryl and each X is a halogen selected from the group consisting of Cl, Br and I on a material selected from the group consisting of arylamines and polymethine dyes which experience a change in the presence of said halogen-containing free radicals; the improvement which comprises: preparing a film containing as the essential constituent, material selected from the group consisting of said arylamines and polymethine dyes, and substantially free from any of said free-radical producing organic halogen compounds; bringing said free radical producing organic halogen-containing compound into intimate physical contact with said film containing the remaining constituents of the photosensitive composition concurrently with exposure of the same to form an image, and thereafter removing the image bearing composition from contact with the halogen-containing organic compound, whereby no undecomposed organic halogen compound remains in contact with the film and the image bearing exposed film is substantially insensitive to re-exposure.

2. The process of claim 1 wherein the exposure and the bringing into contact are simultaneous.

3. The process of claim 1 wherein the organic compound is carbon tetrabromide and the member is diphenylamine.

4. The process of claim 1 wherein the organic halogen-containing compound is in the form of a vapor when it is brought into physical contact with the remainder of the photosensitive composition.

5. The process of claim 1 wherein the organic halogen-containing compound is in the form of a liquid when it is brought into physical contact with the remainder of the photosensitive composition.

6. The method of claim 1 wherein the photosensitive composition comprises a coating on a clear plastic film, brought into physical contact with the organic halogen-containing compound.

7. The method of claim 1 wherein the photosensitive composition is impregnated in a sheet of paper when brought into physical contact with the organic halogen-containing compound.

8. The method of claim 1 wherein the member is a bleach-out dye.

References Cited in the file of this patent

UNITED STATES PATENTS

| | | |
|---|---|---|
| 1,503,595 | Mees | Aug. 5, 1924 |

FOREIGN PATENTS

| | | |
|---|---|---|
| 647,922 | Great Britain | Dec. 28, 1950 |
| 814,449 | France | Mar. 15, 1937 |